United States Patent [19]
Schiwek

[11] Patent Number: 5,466,379
[45] Date of Patent: Nov. 14, 1995

[54] METHOD OF REMOVING OIL AND OIL LIKE ENVIRONMENTAL CONTAMINANTS FROM WATER OF GROUND SURFACES

[76] Inventor: Helmut Schiwek, Am Waldessaum 3, Duisburg, Germany

[21] Appl. No.: 166,981

[22] Filed: Dec. 13, 1993

[51] Int. Cl.⁶ ............................................. C02F 1/42
[52] U.S. Cl. .................. 210/680; 210/691; 210/774; 210/787; 210/924; 210/242.4; 210/484; 210/500.26; 210/505; 210/799; 110/235
[58] Field of Search ................... 210/924, 242.4, 210/484, 500.26, 680, 691, 787, 774, 791, 799, 505; 110/235

[56] References Cited

U.S. PATENT DOCUMENTS

| | | |
|---|---|---|
| 3,630,891 | 12/1971 | Peterson . |
| 3,681,237 | 8/1972 | Orban . |
| 3,739,913 | 6/1973 | Bogosian . |
| 3,888,766 | 6/1975 | De Young . |
| 3,933,632 | 1/1976 | Peterson . |
| 4,006,079 | 2/1977 | Langlois . |
| 4,070,287 | 1/1978 | Wiegand et al. . |
| 4,142,969 | 3/1979 | Funk . |
| 5,078,890 | 1/1992 | Conche . |

FOREIGN PATENT DOCUMENTS

| | | |
|---|---|---|
| 2081958 | 6/1993 | Canada . |
| 0395468 | 4/1990 | European Pat. Off. . |
| 0375235 | 6/1990 | European Pat. Off. . |
| 0545050 | 9/1993 | European Pat. Off. . |
| 2138259 | 5/1971 | France . |
| 2401214 | 3/1977 | France . |
| 2646189 | 3/1989 | France . |
| 1235463 | 9/1967 | United Kingdom . |

OTHER PUBLICATIONS

Helmut Schiwek, Certified English Translation of De 41 40 247 C1 (see entire document).
Ullmanns Enzyklopädie der Technischen Chemie, 4th Edition, Verlag Chemie, vol. 22, pp. 200, 201 (undated).

*Primary Examiner*—Robert A. Dawson
*Assistant Examiner*—David Reifsnyder
*Attorney, Agent, or Firm*—Herbert Dubno

[57] ABSTRACT

Oil and oil products are adsorbed with a three-dimensional lattice structure formed by coating individual glass fibers, assembling them and drying them at a temperature of about 150° C. so that the structure will have; sufficient capillarity to pick up substantial amounts of oil and yet the mat will have sufficient structural stability to be stable. The coating is formed by a mixture of hydrophobizing silicone oil and starch (94 to 96% by weight starch to 6 to 4% by weight silicone). The latticework of the fibers and baked silicone oil/starch mixture can be used to pick up oil on a surface and recover oil from the latticework before the latticework is ultimately destroyed in a garbage incinerator.

6 Claims, 1 Drawing Sheet

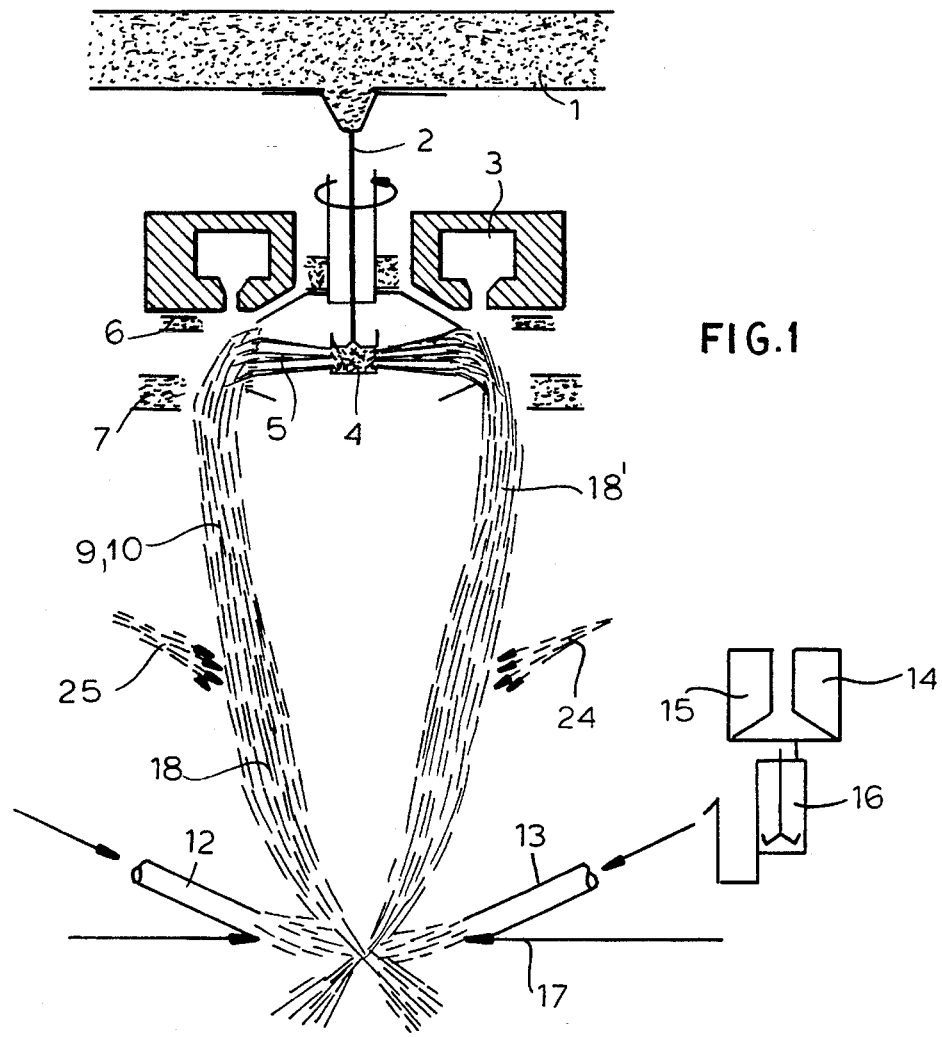
FIG.1
FIG.2
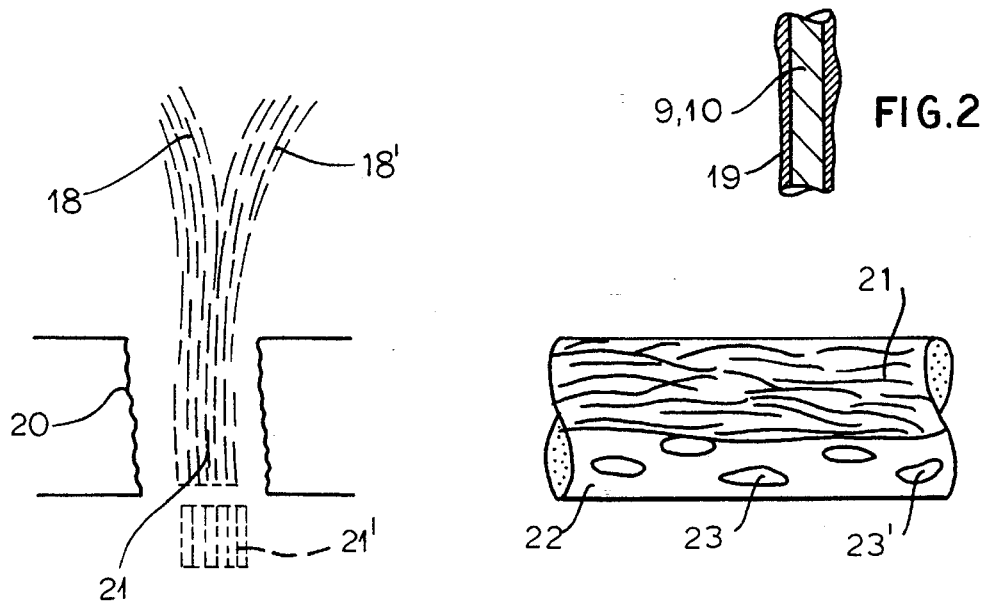
FIG.3
FIG.4

METHOD OF REMOVING OIL AND OIL LIKE ENVIRONMENTAL CONTAMINANTS FROM WATER OF GROUND SURFACES

FIELD OF THE INVENTION

My present invention relates to a method of or to a process for the removal of oil and oil like substances, generally environmental pollutants, from water or ground surfaces and to an oil adsorber particularly suitable for that purpose.

More particularly, the invention relates to a process for avoiding or obviating contamination of water or ground surfaces by oil or oil-like substances by the application of hydrophobic inorganic fibers to the contaminated region, storing the recovered oil and the fibers, and disposing at least part of the oil by at least a partial separation of the fibers and the oil. The invention also relates to an oil adsorber capable of picking up oil or oil like substances from water or ground surfaces and comprised of inorganic fibers which are provided with silicone as a hydrophobizing agent.

BACKGROUND OF THE INVENTION

With continuously increasing use of oil transports, the danger of environmental contamination by oil liberated from tank trucks, rail tank cars and tank ships (tankers) has also increased. Because of oil-release catastrophes only in the last several years, entire stretches of coastlines have been contaminated and life in the water and contaminated regions has been completely destroyed.

There have been many efforts to obviate these drawbacks, for example, by pumping the oil from the water or ground surface, to neutralize oil and oil like substances by supplying a variety of materials thereon, and in similar ways to remove the oil or render it less pernicious.

From French Patent 2,646,189, for example, it is known to blow hydrophobized mineral fibers onto the water surface to allow these fibers to pick up the oil or oil like substances, and to remove the fibers and thus the picked up oil.

The mixture of fibers and oil can be stored and disposed of. The fibers are relatively short and can be hydrophobized by treatment with a silicone oil.

The amount of silicone oil added to the fibers is about 0.5 to 3%.

A disadvantage of this known process is that the relatively short mineral fibers tend to sink when they do not come into contact with the oil sufficiently quickly. As a result, a portion of the mineral fiber material blown onto the surface is lost before it can become effective. The contamination of the seabed or the ground by such unused fibers is significant.

French Patent 2,401,214 also discloses the pickup of oil by mineral fibers in which the mineral fibers are previously impregnated with a binder. This process has many of the same drawbacks as that of French Patent 2,646,189.

The British Patent 1,235,463 discloses a process in which oil lying upon a water surface can be picked up by inorganic fibers, the fibers having previously been treated with a water blocking material. The fibers float on the water and come into contact with and then store the oil by adhesion of the oil to surfaces of the fibers.

The oil is disposed of by combustion of the fibers. Because of the fact that the oil picked up by the fibers cannot be burned simply and efficiently, this system gives rise to a significant environmental contamination by the release of noxious, toxic or noisome materials into the environment.

It should also be noted that the earlier systems described, whereby materials are supplied on the surfaces of the water and then removed along with the oil or oil like substances, do not achieve the high levels of oil removal desired. Furthermore, these systems do not permit the oil to be rapidly and reliably removed from the water for intervening storage. The recovery of the fibers after separation of the oil therefrom is costly and there is always the drawback that a part of the fibers sink in the water or for other reasons, cannot be recovered.

OBJECTS OF THE INVENTION

It is, therefore, the principal object of the present invention to provide a rapid and reliable process for dealing with tanker discharges and oil discharge from wrecks and, more particularly, to provide improved removal of oil or oil like substances from water or ground surfaces.

Another object of the invention is to provide a method of the type described that enables practically complete removal of the oil or oil like substances in an environmentally sound manner.

SUMMARY OF THE INVENTION

These objects and others which will become apparent hereinafter are attained, in accordance with the present invention, by providing high temperature blown glass wool with a silicone hydrophobizing agent and a starch (polysaccharide) binder to enable the thus treated glass wool to be collected into a cuttable matlike gridlike or lattice structure prior to or during a drying to 150° C. so that the coherent product, after drying, can be deposited on the water or ground surfaces contaminated with the oil or oil-like substance, thereby enabling the glass wool to fully soak up and become saturated with the oil or oil-like substance and to be stored interveningly.

After storage, the product can be subjected to a mechanical or thermal separation whereby the oil or oil-like substance is separated from the fibers. When the fibers are recovered, they can be reused.

More particularly, a method of removing oil and oil like substances from a surface comprises the steps of:

(a) forming a glass-wool mat consisting of soft-glass glass fibers of a diameter of substantially 5 to 7 μm;

(b) spraying onto the mat a hydrophobizing and binder mixture consisting of 94% to 96% by weight of starch and 6% to 4% by weight of a silicone, to coat the fibers of the mat with the mixture, the mixture being sprayed onto the mat in a quantity such that the starch and silicone together are present in an amount of 7% to 10% of the weight of the mat;

(c) thereafter baking the mat with the mixture sprayed onto the fibers thereof at a temperature of about 150° C. to dry the mat and bond the mixture to the fibers and the fibers together in a liquid-permeamble latticework;

(d) repeatedly applying the latticework to a surface of a body of water contaminated with the oil or the oil-like substances, to take up the oil or oil-like substances in the latticework, thereby saturating the latticework with the oil or oil-like substances;

(e) upon each saturation of the latticework with the oil or oil-like substances removing the latticework from the body of water and extracting the oil or oil-like substances therefrom; and (f) subsequently burning the latticework to destroy it at a temperature sufficient to burn off the starch and silicone and to melt the glass fibers, thereby enabling environmentally sound destruction of the mat.

The adsorber for this purpose comprises:

a high-temperature blown glass wool comprised of high-temperature spun glass fibers of softglass coated with a silicone hydrophobizing agent and a polysaccharide binder and which after coating and at least upon drying have been assembled into a cuttable mat-form latticework of mutually adherent coated fibers, and hardened.

With the process of the invention it is possible, even in the case of major tanker disasters or corresponding levels of environmental pollution, to effectively deposit pieces of the aforedescribed mat rapidly onto the surface provided with the oil or oil like substances, to imbibe the substances into the matlike structure, thereby binding the oil, and enabling the connected oil to be carried away.

The combined coating of the individual glass wool fibers (by the silicone and the starch) insures that the individual fibers after such coating will not lie loosely on one another but will rather be collected and stick to one another in a grid work or lattice work structure capable of taking up large quantities of oil or other contaminants.

According to the invention, the mats can be picked up again from the surface with practically no loss of fibers by sinking, and stored for a time period sufficient to allow preparation of the final disposal.

The final disposal steps can vary. In general, they will involve mechanical or thermal separation of the oil from the glass wool.

The steps chosen will depend on whether one wishes to reuse the glass wool or not.

By baking the contacting coated fibers at around 150° C., not only is the drying of the coating accelerated, but there appear to be certain reactions between the silicone/starch mixture and the individual fibers. The starch insures that the fibers will stick together without materially limiting the porosity of the mat so that the mat will have the requisite stability but nevertheless be capable of picking up to oil or oil like substances. The mat forms a space grid or lattice which has a capillary action for bibulously taking up the oil or oil like substances.

An advantageously high ratio of internal volume to mass can be obtained when the lattice work has 7 to 10% by weight of the silicone and starch mixed with the gas fibers, this ratio provides the requisite stability of the mat and an overall bulk density which is satisfactory.

A sufficient adhesive effect is obtained when the mixture of silicone and starch contains 94 to 96 percent by weight starch to 4 to 6 percent by weight silicone, the two being pre-mixed and fed together to the glass wool. During the drying process a heating is effected which leaves a lattice work of high surface area capable of adsorbing large quantities of oil and oil like substances.

An extremely important feature or advantage of this invention is that with the aforementioned hydrophobizing and binder mixture of 94 to 96% by weight starch and 6 to 4% by weight silicone, in combination with the softglass glass-fibers of the glass-wool mat is that the entire mat or lattice work can be readily destroyed by comparatively low temperature incineration, e.g. in a garbage incinerator. As contrasted with mineral wools generally and high temperature or refractory glass wools which are not generally affected by the temperatures prevailing in a garbage type incinerator, the soft glass wool of the instant invention can be converted to a molten product in the ash which can be disposed of by deposit in landfills or the like without any danger of environmental contamination. In the proportions of the starch and silicone recited, the destruction by incineration of the mat can fully destroy the components of the binder without any release of environmental contaminants into the atmosphere or any residues in the ash or melt which, upon solidification, can be dumped in the landfill.

Since the glass fibers themselves are destroyed entirely by melting, there is no danger that residual contaminants could remain adherent to fibers which might be deposited in a landfill.

For the purposes of this description, an oil substance can be any naturally occurring or synthetic oil, especially crude oil or partly or fully refined oil products. Oil-like substances are substances with long chains or other hydrophobic character which causes them to float on water or to be capable of being picked up by mats of glass fiber hydrophobized with silicone oil and rendered coherent in porous mats by combination of the silicone with starch and a baking or drying operation.

For the greatest uniformity in coating of the glass fibers, the invention provides prior to or at collection of the fibers produced by a high temperature fiber spinning process, for spraying of silicone and starch onto the fibers or a strand of the fibers. Practically each individual fiber can thus be coated in a pretreatment prior to collection of the fibers, for example.

Advantageously, the fibers are so sprayed that droplet formation practically does not occur, thereby insuring uniform coating of the individual fibers and enabling the collection of the coated fibers in a particularly simple manner.

The fibers are collected into a cuttable matlike lattice work that is optimal for oil adsorption.

The term "matlike" is here used to indicate that the fibers contact one another through their coatings and after baking of the starch, both lengthy and crosswise to generate a coherent structure of whatever shape may be convenient. The shape may be that of a web which can be cut into lengths, or of a strand which can be cut into lengths and the pieces spread upon the surface which is contaminated with the oil.

To maximize the surfaces provided for contact with the oil, a large internal space for the mass of fibers is provided. However, in many cases it has been found to be desirable to compact the mass or strand of the spayed fibers before the drying and baking step.

The compaction has been found to give rise to enhanced capillarity and thus does not materially reduce the bibulousness of the fiber.

If a high bulk density is desired, the fibers after spraying with silicone and starch are collected while being forced together, e.g. by passing them through a constriction, the mass being then dried and baked while constricted. This forcible collection of the fibers serves to provide the pressing of them together which insures a high bulk density.

High surface area and nevertheless high stability can be obtained when the glass wool is formed from softglass wool with a fiber diameter with a diameter of 5 to 7 μm (microns). This fine glass wool can be stabilized by providing the fibers of any necessary length and coating them with the silicone and starch and baking them as indicated.

These fine glass wools have an especially high capacity to absorb oil. For example, they may have a pick up capacity of 1:30, i.e. can take up a weight of the oil which can be 30 times the weight of the mat-like material. A layer of softglass wool with a weight of 30 g, therefore, can pick up 900 g of oil when treated in accordance with the present invention.

The oil-saturated glass wool mats can be separated from the oil in different ways. For example, the glass wool mats saturated with oil or oil like substances can be directly subjected to pyrolysis or to a heat treatment at temperatures of say 850° C. to liberate the oil therefrom. At these temperatures, the glass may be melted and can be used, upon crushing, in roadway construction, completely free from oil residues.

It is also possible to remove the oil from the glass wool mat by centrifugation or simply by pressing the oil-laden mat together. These types of spaces have the advantage that the glass wool mats remain intact and can be reused. It is, however, a drawback if the oil is not 100% removed from the glass wool mat. In practice these methods allow removal of the oil only to say 99%.

Another advantage of this approach is that the oil is obtained in a usable form and has been recovered from the environment.

In centrifugation, the centrifugal force is so selected that the glass wool mats are not torn apart and can be 100% reused.

In oil burning plants where the combustion requires auxiliary burners, e.g. for garbage incineration, the glass wool mats saturated in oil can be fed to the garbage incinerator. The oil is burned and the solid residues collect with the solid residues of the glass wool mat in the ash while any other residues are carried away in the flue gas which can be treated in a conventional manner.

The spreading of an oil carpet can be advantageously supressed by filling the glass wool mats into a perforated tube which can be applied to the surface of the water as a barrier against spreading of the oil.

The oil at the surface of the water can pass through the perforated tube and be drawn into the glass wool mats to saturate the latter. The tubes can be hoses composed of a material which does not pose an environmental contamination problem and which does not introduce contaminants into the environment.

After the glass wool mats have adsorbed to saturation the oil, the tube tends to sink so that new zones of the mat come in contact with the oil to take up the oil of the carpet. Since the oil itself is a floating medium, the barrier tube never completely sinks and the tube or barrier, saturated with oil, can be removed from the surface. The oil can be pressed or centrifugal displaced from the barrier or tube and the barrier or tubes reused.

The enormous pick up capacity of the barrier or the mat contained therein guarantees an effective restriction of the spread of the oil carpet and its ultimate removal from the surface of the water. However, it also interrupts the carpet so that at least a part of the oxygen required for the well-being of the biosphere therebelow is certain of reaching it.

The oil adsorber can be left as islands in place permanently so that small fields of oil which are liberated, e.g. in a drilling process or otherwise, can continuously be collected without danger that they will spread further over the water surface.

Another advantage of the glass wool mats in perforated hose by comparison with earlier attempts to pick up oil, is that the explosion danger is reduced or completely eliminated.

Oil adsorbers in the sense of the present invention have not been provided heretofore. For example, if one refers to the inorganic fibers which are hydrophobized in accordance with the French Patent 2,646,189, and which are only cast upon the water, one readily appreciates that there is no stable framework or structure to these fibers and thus no lattice work. The result is, of course, that the absorber of the adsorber of the invention can use capillary action between the fibers of the fixed structure to assist in trapping the oil whereas the loose fiber system of the patent cannot exploit a similar effect.

The difference, therefore, is that the structures of the invention which are applied to the water are three-dimensional in nature and have dimensions of length, thickness and width or depth and the oil is trapped in the three-dimensional structure at least in part by a capillary effect. In the loose-fiber system, the effective element is the single fiber which is practically a two-dimensional system having only length and technique as relevant dimensions and thus no ability to provide a three-dimensional containment.

The capillary effect, moreover, prevents the oil from retransferring to the water when the pieces of the mat are withdrawn from the water surface. Naturally, the amount of oil which is trapped in the mat-like structure of the invention will depend in part on the viscosity of the oil. When the oil is comparatively of low viscosity or is a substance like gasoline with an oil-like character and extremely low viscosity, the capillary effect in trapping this substance is particularly important. The pieces of the mat serve to store the oil or oil-like product until the removal step can be carried out. It is important to note that oil is picked up by the mats of the invention until the capillaries are saturated and the individual glass fibers which are combined in the three-dimensional structure are fully coated with the oil.

The tube or hose which is used to receive the adsorber when the latter is to form a barrier or the like, can be composed of a foil, with appropriate perforations. The foil can be wrapped around the glass wool lattice mat and then welded closed along a seam so that manual work can be minimized. The perforated tube or hose also serves to protect the adsorptive mat against deterioration and premature contamination.

High pick-up capacity on the one hand and stability on the other can be assured with a glass wool lattice mat product in accordance with the invention which has a bulk density of 18–42 Kg/m$^3$. The adsorption effect is a maximum when the glass fibers after coating are loosely packed together. The baking forms a highly stable and permeable latticework, i.e. a three-dimensional capillary structure, which has been found to be capable of storing large quantities of oil. At 150° C. the reaction of the silicone and/or starch with the fiber is accelerated and optimized to bind the small diameter glass fibers in the latticework.

The invention provides a process and an oil adsorber for this process which can repeatedly pick up oil in the case of a tanker catastrophe or like environmental discharges of oil. The oil adsorber can be placed upon the ground surface or the water until it is completely saturated with oil or the oil like substance and binds these substances so that they can be transported away together with the glass wool mat. The glass wool mat is then treated to remove the oil therefrom. The removal of the oil is necessary to enable the mat to be reused or stored for later reuse.

It is surprising that the glass wool latticework mats of the invention pick up oil and oil like products very rapidly and hold these substances quite firmly so that reliable removal from the contaminated region is possible. It is also a surprise that the mat can be desorbed very quickly as well.

BRIEF DESCRIPTION OF THE DRAWING

The above and other objects, features and advantages of my invention will become more readily apparent from the following description, reference being made to the accompanying highly diagrammatic drawing in which:

FIG. 1 is a vertical section through an apparatus for producing glass fiber schematically showing the process and the coating thereof;

FIG. 2 is a section through an individual glass fiber;

FIG. 3 is a diagram illustrating the stage subsequent to that of FIG. 1; and

FIG. 4 is a diagrammatic section showing a glass wool lattice mat received in a perforated tube or hose.

SPECIFIC DESCRIPTION

FIG. 1 shows a softglass melt 1 which is heated in a conventional manner and is delivered at 2 in a molten glass stream, to the region of a burner 3. The glass flows into a rotating basket forming a spinner 5 for discharging thin streamlets of the glass which rapidly cool to form the pipe. An induction heater 7 maintains the temperature of the streamlets until cooling is effected.

The result is a curtain 18 of individual glass fibers 9, 10 upon which a mixture of starch and silicone oil, i.e. the silicone oil of French Patent 2,646,189 or a like hydrophobizing silicone oil, is sprayed via spray tubes 12 and 13 directed at the fibers.

The spray tubes 12 and 13 are connected to a mixing vessel 16 which is fed with silicone from the vessel 14 and the starch from the vessel 15.

A hot air inlet 6 surrounds the basket 4 and provides thermal control of the process. The air nozzles 17, which provide cooling, supply ambient air.

FIG. 10 shows an individual glass fiber 9, 10 which is provided with a coating 19 consisting of the mixture of silicone and starch. For illustrative purposes only, the coating has been shown drawn to a greater scale than it is in practice.

From FIG. 1 shows it will be apparent that the opposite sides of the glass curtain are brought together and hence the fibers are assembled together as they are sprayed or after they have been sprayed with the starch/silicone mixture.

The fibers can then be passed as a strand 21 through a furnace heating zone 20. The degree with which the bundle of fibers is forced together under can depend upon the force of the air streams 17 or the configuration of a die or passage (constriction) through which the fiber stream is drawn.

In FIG. 3 the drying process is effected at about 150° C. There are, of course, other possibilities for heating the glass wool fiber mat.

While the embodiment of FIG. 1 shows the binder fed to only one point along the path of the fibers, it is also possible to have additional locations 24 and 25 for example, at which silicone oil or starch or both can be sprayed upon the fibers, the second spray for the other component being provided in the region of the spray tubes 12 and 13.

The glass-wool fiber mat, coated with the silicone oil and starch mixture and baked in the manner described is cut up into strips of the latticework and deposited upon the oil-coated surface, thereby picking up the oil from this surface in the interstices of the latticework strips. When the strips are saturated with the oil, they are collected and pressed or centrifuged to remove the oil or heated to pyrolytically destroy the oil, the strips being then used to pick up additional oil. The process is repeated until disposal of the latticework is desired, whereupon the latticework is burned in a garbage incinerator to melt the glass fibers which can be dumped in a landfill with the garbage incinerator ash.

I claim:

1. A method of removing oil from water, comprising the steps of;

(a) forming a glass-wool mat consisting of soft-glass glass fibers of a diameter of substantially 5 to 7 μm;

(b) spraying onto said mat a hydrophobizing and binder mixture consisting of 94% to 96% by weight of starch and 6% to 4% by weight of a silicone, to coat the fibers of said mat with said mixture, said mixture being sprayed onto said mat in a quantity such that the starch and silicone together are present in an amount of 7% to 10% of the weight of the mat;

(c) thereafter baking said mat with said mixture sprayed onto the fibers thereof at a temperature of about 150° C. to dry said mat, to bond said mixture to said fibers and to bond said fibers together in a liquid-permeamble latticework;

(d) repeatedly applying said latticework to a surface of a body of water contaminated with said oil substances, to take up said oil substances in said latticework, thereby saturating said latticework with said oil;

(e) upon each saturation of said latticework with said oil removing said latticework from said body of water and extracting said oil therefrom; and (f) subsequently burning said latticework to destroy it at a temperature sufficient to burn off said starch and silicone and to melt said glass fibers, enabling environmentally sound destruction of the mat.

2. The method defined in claim 1 wherein, in step (e) the oil is separated from the latticework by centrifugation.

3. The method defined in claim 1 wherein, in step (e) the oil is separated from the latticework by compressing the latticework saturated with the oil or by heating the latticework saturated with the oil to a temperature of at least 850° C.

4. The method defined in claim 1 wherein said glass wool in introduced into a perforated tube which is applied to said surface as a barrier to spreading of the on said surface.

5. The method defined in claim 4 wherein in step (e) the oil is separated from the latticework by pyrolysis of the oil.

6. The method defined in claim 6 wherein in step (f) the latticework is destroyed by incineration in garbage incinerator.

\* \* \* \* \*